(12) United States Patent
Suzuki et al.

(10) Patent No.: US 7,273,505 B2
(45) Date of Patent: Sep. 25, 2007

(54) HYDROGEN GENERATOR AND FUEL CELL POWER GENERATION SYSTEM

(75) Inventors: Motohiro Suzuki, Suita (JP); Tomonori Asou, Kitakatsuragi-gun (JP); Yuji Mukai, Kadomo (JP); Kunihiro Ukai, Ikoma (JP); Akira Maenishi, Ikeda (JP); Yoshio Tamura, Kashihara (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 704 days.

(21) Appl. No.: 10/821,177

(22) Filed: Apr. 9, 2004

(65) Prior Publication Data

US 2005/0026011 A1 Feb. 3, 2005

(30) Foreign Application Priority Data

Jul. 29, 2003 (JP) .............................. 2003-281457

(51) Int. Cl.
*B01J 7/00* (2006.01)
*H01M 8/18* (2006.01)

(52) U.S. Cl. ........................ 48/127.9; 429/12; 429/19

(58) Field of Classification Search ............... 48/127.9; 429/12
See application file for complete search history.

(56) References Cited

U.S. PATENT DOCUMENTS

2002/0042035 A1* 4/2002 Komiya et al. .............. 431/268
2003/0129100 A1* 7/2003 Ukai et al. .................. 422/177

* cited by examiner

*Primary Examiner*—Melvin Mayes
*Assistant Examiner*—Lessanework T Seifu
(74) *Attorney, Agent, or Firm*—Stevens, Davis, Miller & Mosher, LLP

(57) ABSTRACT

A hydrogen generator comprises therein a reformer, a Shifter, a material flow passage with first evaporator through which a material is supplied to the reformer, a reformed gas flow passage for leading the reformed gas derived from the reformer to the Shifter, a shifted gas flow passage through which a shifted gas derived from the Shifter is taken out, and second steam flow passage formed adjacent to the reformed gas flow passage to be located at upstream side of the Shifter. The second evaporator is provided within the second steam flow passage. A part of heat of the reformed gas is recovered as latent heat by the second evaporator. Thereby, temperature of the Shifter is controlled.

17 Claims, 4 Drawing Sheets

HYDROGEN GENERATOR AND FUEL CELL POWER GENERATION SYSTEM

BACKGROUND OF THE INVENTION

1. Field of the Invention

The present invention relates both to a hydrogen generator configured to reform a hydrocarbon-based feed gas such as a city gas or a LP gas using steam to generate a reformed gas containing hydrogen as major component, and to a fuel cell power generation system comprising the hydrogen generator.

2. Description of the Related Art

A hydrogen generator configured to steam-reform a hydrocarbon-based feed gas such as a city gas or a LP gas to generate a reformed gas containing hydrogen as major component is used to, for example, generate hydrogen for use as a feed gas in a fuel cell. Such a reaction is called a steam reforming reaction or a reforming reaction. Since the reforming reaction in the hydrogen generator is an endothermic reaction, a reformer must keep its temperature between approximately 550 to 800° C. to maintain the reforming reaction To this end, in the hydrogen generator, a heat source such as a burner is installed to heat the reformer using a high-temperature combustion gas derived from the heat source, or heat radiator that emits radiation heat of the combustion gas.

The reformed gas obtained in the reformer of the hydrogen generator contains CO generated as by-product in the reforming reaction, as well as hydrogen as major component. If the reformed gas containing GO is directly supplied to the fuel cell, then CO degrades activity of a catalyst within the fuel cell. In order to remove CO, the hydrogen generator is provided with a Shifter and a Purifier located downstream of the reformer to shift CO contained in the reformed gas into $CO_2$.

For the purpose of conducting the shift reaction efficiently, the Shifter of the conventional hydrogen generator is set at a temperature between 180 to 400° C., which is an optimum temperature for the shift reaction. In order for the Shifter to be kept at such a temperature, heat recovered from the reformed gas of a temperature between 550 to 800° C. which is generated in the reformer is used to heat the Shifter, while the Shifter is cooled by heat exchange between a combustion gas (combustion off gas) after use as the heat source to heat the reformer and the Shifter (see Japanese Laid-Open Patent Application Publication No. 2002-25593, page 4 to 7, FIG. 1), or the Shifter is cooled by heat exchange with a combustion fuel gas used in the heat source such as the burner or air (see Japanese Laid-Open Patent Application Publication No. 2002-187705, page 5 to 10, FIG. 1).

In the conventional hydrogen generator constructed as described above, heat recovered from the Shifter by the combustion gas, the combustion fuel gas or the air to allow the Shifter to be cooled, is not transmitted to the feed material or the steam, and thus, efficient use of such recovered heat has not been achieved. For this reason, it is difficult to return a substantially total heat to the reformer, and therefore, sufficiently high heat efficiency is not achieved.

In the above construction, temperature of the fuel off gas, a flow rate of the combustion fuel gas or the air varies if a load of hydrogen generation in the reformer varies. When conditions of the combustion off gas, the combustion fuel gas, and the air vary, the amount of heat recovered from the Shifter correspondingly varies. For this reason, it is difficult to control the amount of heat recovered from the Shifter. As a result, since the Shifter is not kept at an optimum temperature, ability of the Shifter to remove CO is not sufficiently high. And, if the gas containing a substantial amount of CO is supplied to the fuel cell in the fuel cell power generation system, performance of the fuel cell would be degraded.

SUMMARY OF THE INVENTION

The present invention has been developed under the circumstances, and an object of the present invention is to provide a hydrogen generator capable improving heat efficiency and ability to remove CO, and a fuel cell power generation system comprising the hydrogen generator.

According to the present invention, there is provided a hydrogen generator comprising: a reformer configured to reform a material using steam supplied to the reformer; a evaporator that evaporates water supplied from a water supply portion into the steam, to generate a reformed gas containing hydrogen as a major component; a material flow passage through which the steam and the material are supplied to the reformer; a shifter configured to shift carbon monoxide contained in the reformed gas into carbon dioxide by a shift reaction; a reformed gas flow passage through which the reformed gas is sent to the shifter; a shifted gas flow passage through which the shifted gas from the shifter flows; and a combustor configured to heat the reformer using a combustion gas, wherein the reformed gas flow passage and the evaporator are configured to conduct heat exchange between them, a part of heat of the reformed gas flowing through the reformed gas flow passage is used to generate the steam in the evaporator by the heat exchange to allow the reformed gas to be cooled, and radiation heat from the shifter is transferred to the evaporator through the reformed gas flow passage and used to generate the steam in the evaporator.

In accordance with the above construction, by using a part of the heat of a high-temperature gas to generate steam in the evaporator, the part of the heat of the reformed gas is recovered to allow the reformed gas to be cooled. And, the cooled reformed gas is supplied to the shifter to allow the temperature of the shifter to be controlled. More heat can be recovered in heat exchange between water and the reformed gas than in heat exchange between gases, for example, a combustion fuel gas, air, or a feed gas and the reformed gas. As a result, thermal efficiency is improved.

Also, in accordance with the above construction, since temperature control of the shifter is carried out by using water externally supplied without being affected by other parts within the generator, controllability is improved. In particular regardless of load fluctuation in the amount of hydrogen generation in the reformer, high temperature controllability can be achieved. From these, base metal including Cu or Zn, which is limited in available temperature range because of its low heat resistance, can be used as a catalyst of the shifter.

Further, since the radiation heat is used to generate the steam in the evaporator, thermal efficiency is further improved.

The hydrogen generator may further comprises a first evaporator configured to evaporate water supplied from a first water supply portion into first steam by the combustion gas derived from the combustor and/or radiation heat of the reformer; and a second evaporator configured to conduct heat exchange with the reformed gas flow passage, and to evaporate water supplied from a second water supply portion into second steam by using heat of the reformed gas which is recovered by the heat exchange with the reformed gas flow passage, wherein the material flow passage includes: a first steam flow passage through which the first steam and the material are supplied to the reformer, and a second steam flow passage through which the second steam is supplied to the reformer.

The second steam flow passage may be connected to the first steam flow passage at a location upstream of the reformer in gas flow. In this structure, water remaining unevaporated in the second evaporator is supplied to the first evaporator through the second steam flow passage and the first steam flow passage, and evaporated in the first evaporator. Since water droplets are not supplied to the reformer, the reforming reaction is conducted stably therein.

Preferably, the second evaporator may be located above the shifter, and a water evaporation surface of the second evaporator is substantially horizontal. In accordance with such a construction, pool boiling caused by heating from below can be realized, and hence, pressure fluctuation caused by bumping can be inhibited.

The second steam flow passage and the shifted gas flow passage may be configured to exchange heat between them to allow the second steam to recover at least a part of the heat from the shifted gas. Thereby, since a reaction heat generated in the shifter can be recovered, thermal efficiency can be further improved.

A body of the hydrogen generator may be internally structured such that: a plurality of axial walls are arranged concentrically to be spaced a predetermined distance apart from one another and a plurality of radial walls are provided at predetermined end portions of the axial walls so as to cross the axial walls to define the material flow passage, the reformed gas flow passage, the shifted gas flow passage, a combustion gas flow passage, and the first and second evaporators, the reformer extending along a center axis of the body, and the shifter being formed at a location in an axial direction of the reformer, the first evaporator is disposed to allow at least one of heat exchange with the combustion gas flow passage and use of radiation heat from the reformer, the first steam flow passage of the material flow passage is disposed to enclose an outer periphery of the reformer in such a manner that one end of the first steam flow passage is fluidically connected to the first evaporator, and an opposite end thereof is connected to one end face of the reformer in the axial direction corresponding to an upstream face of the reformer in gas flow, the reformed gas flow passage is disposed so as to enclose the outer periphery of the reformer in such a manner that one end thereof is fluidically connected to an opposite face of the reformer in the axial direction corresponding to a downstream face of the reformer in gas flow and an opposite end thereof is disposed along and fluidically connected to one end face of the shifter in the axial direction corresponding to an upstream face of the shifter in gas flow, and the shifter is disposed to be opposed to the upstream face of the reformer in the axial direction, the shifted gas flow passage is configured such that one end thereof is fluidically connected to an opposite end face of the shifter corresponding to a downstream face of the shifter in gas flow, the second evaporator is disposed adjacent the reformed gas flow passage extending along the upstream face of the shifter, and the second steam flow passage is configured such that one end thereof is fluidically connected to the second evaporator and an opposite end thereof is fluidically connected the upstream face of the reformer.

The hydrogen generator may further comprise a temperature detector configured to detect temperature of the shifter, wherein, based on the temperature of the shifter which is detected by the temperature detector, an amount of the water supplied from the second water supply portion to the second evaporator is adjusted. Thereby, high temperature controllability is achieved, and hence the shifter can be kept at an optimal temperature for a shift reaction.

The water supplied from the first water supply portion to the first evaporator may be more in amount than the water supplied from the second water supply portion to the second evaporator. For example, if the amount of water supplied from the second water supply portion is set to not more than ⅕ the amount of water supplied from the first water supply portion, a pressure ratio between the material and the steam supplied to the reformer do not vary regardless of variation in the amount of water supplied from the second water supply portion. Since the pressure fluctuation with resect to the material can be inhibited, the reforming reaction is carried out stably in the reformer.

The second water supply portion configured to supply the water to the second evaporator may include a water supply unit and a supply pipe that leads the water supplied from the water supply unit to the second evaporator, and a distance between a water outlet of the supply pipe and the water evaporation surface of the second evaporator may be a distance at which a water droplet formed at the water outlet comes in contact with the water evaporation surface before the water droplet drops. For example, the water outlet may have a hole diameter of not less than 0.5 mm and not more than 5 mm. In this structure, the water is continuously supplied to the water evaporation surface, the pressure fluctuation with respect to the material can be inhibited.

The water outlet may have a flow cross-sectional area of not less than 0.7 mm$^2$ and not more than 20 mm$^2$. An amount of the water supplied from the water supply unit may be not less than 0.1 g/minute and not more than 2 g/minute. Thereby, in at least the tip end portion of the supply pipe, continuous water flow can be formed, and hence the water is supplied continuously from the water outlet to the water evaporation surface.

The supply pipe may have a flow cross-sectional area that gradually decreases toward the water outlet.

It is possible that an edge portion of a pipe wall of the supply pipe forming the water outlet is not on a horizontal plane. For example, a tip end portion of the supply pipe including the water outlet may have a cut out. Thereby, even when the tip end portion of the supply pipe is too close to the water evaporation surface of the second evaporator, water can be supplied continuously and stably.

The tip end portion of the supply pipe including the water outlet may be provided perpendicular relative to the water evaporation surface, or the tip end portion of the supply pipe including the water outlet may be placed in parallel with the water evaporation surface.

The evaporator may be constituted by one evaporator and the evaporator be configured to recover the heat of the reformed gas, the heat of the combustion gas derived from the combustor and/or the radiation heat from the reformer.

A body of the hydrogen generator may be internally structured such that: a plurality of axial walls are arranged concentrically to be spaced a predetermined distance apart from one another and a plurality of radial walls are provided at predetermined end portions of the axial walls so as to cross the axial walls, to define the material flow passage, the reformed gas flow passage, the shifted gas flow passage, the combustion gas flow passage, and the evaporator, the reformer extending along a center axis of the body, and the shifter being located outward relative to the reformer so as to enclose an outer periphery of the reformer in the axial direction, the material flow passage is disposed so as to enclose the outer periphery of the reformer, and one end of the reformed gas flow passage is fluidically connected to one end face of the reformer in the axial direction corresponding to a downstream face of the reformer, the reformed gas flow passage is configured such that one end portion thereof is fluidically connected to an opposite end face of the reformer in the axial direction corresponding to a downstream face of the reformer and an opposite end thereof is disposed along and fluidically connected to one end face of the shifter, corresponding to an upstream face of the shifter, the shifted gas flow passage is configured such that one end thereof is fluidically connected to an opposite end face of the shifter corresponding to a downstream face of the shifter, and the evaporator is disposed adjacent the combustion gas flow passage and the reformed gas flow passage.

The hydrogen generator may further comprise a temperature detector configured to detect temperature of the shifter, wherein, based on the temperature of the shifter which is detected by the temperature detector, an amount of water supplied from the water supply portion to the evaporator may be adjusted. Thereby, temperature controllability can be further improved, and hence the shifter can be kept at an optimal temperature for the shift reaction.

A fuel cell power generation system comprises the above-described hydrogen generator; and a fuel cell configured to generate an electric power by using a fuel gas containing hydrogen as a major component and an oxidizing gas, the fuel gas being supplied from the hydrogen generator.

The above and further objects and features of the invention will more fully be apparent from the following detailed description with accompanying drawings.

DETAILED DESCRIPTION OF THE PREFERRED EMBODIMENTS

Figure 1:
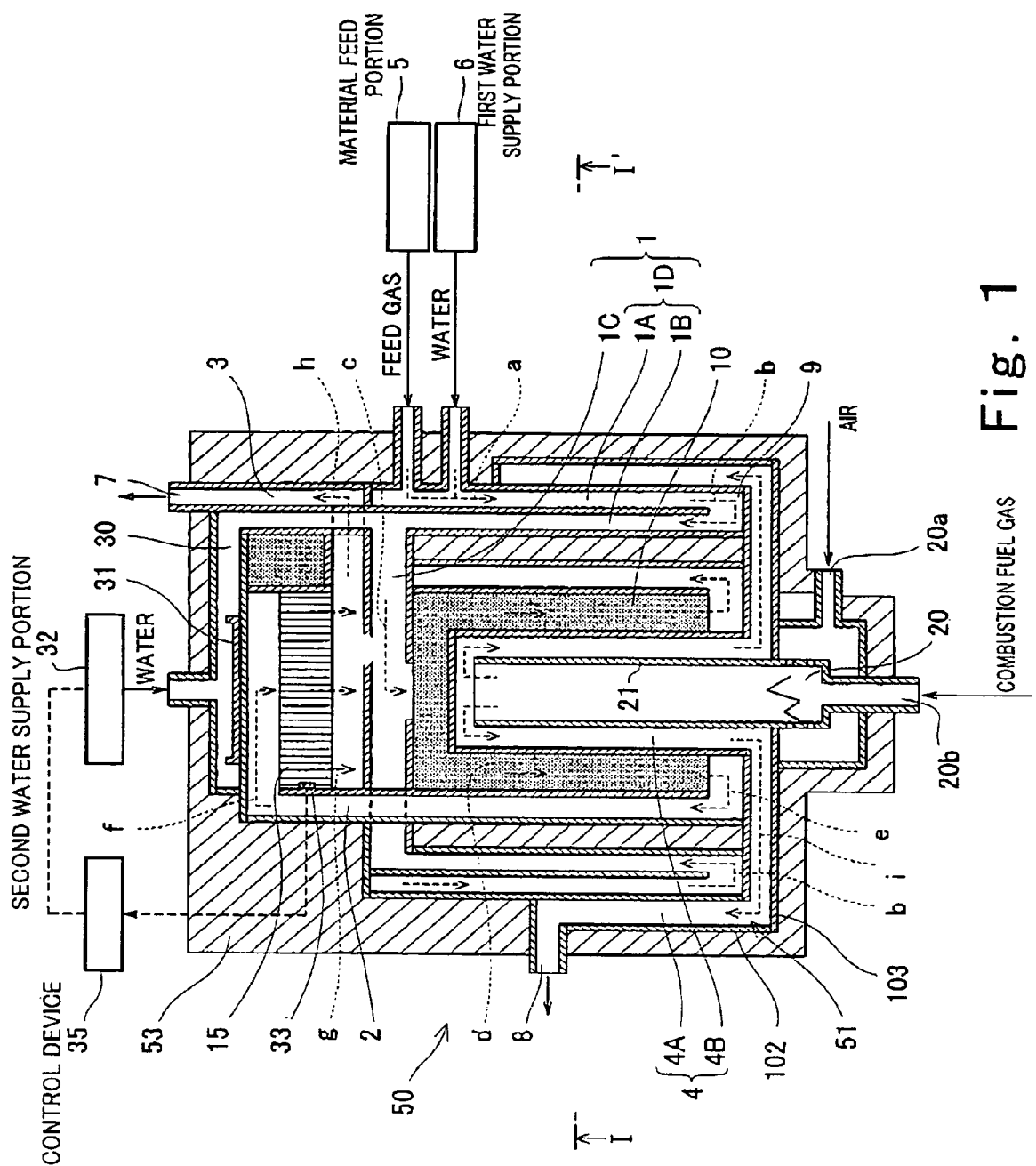
FIG. 1 is a cross-sectional view showing a construction of a hydrogen generator according to a first embodiment of the present invention.

Hereinafter, embodiments of the present invention will be described with reference to the drawings. Drawings show a character configuration of a hydrogen generator according to embodiments and a fuel cell power generation system comprising the hydrogen generator. A conventionally known configuration is not described or shown in the drawings.

Embodiment 1

Figure 2:
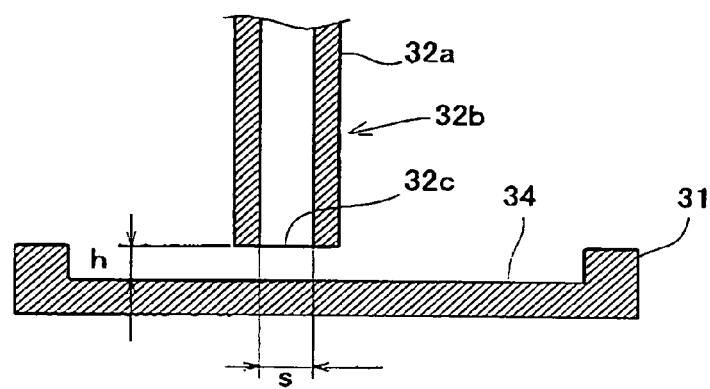
FIG. 2 is a partially enlarged view showing a structure of a second evaporator and a second water supply portion in a second steam flow passage in FIG. 1.
Figures 3A, 3B, 3C, 3D:
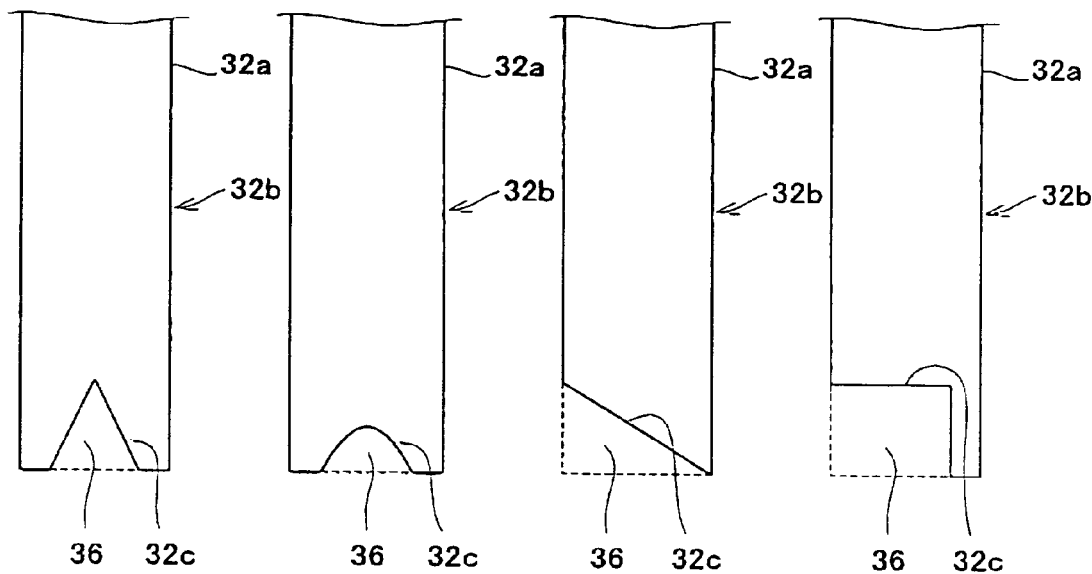
FIG. 3 is a partially enlarged view showing another example of the structure of the second evaporator and the second water supply portion in the second steam flow passage in FIG. 1.
Figure 5:
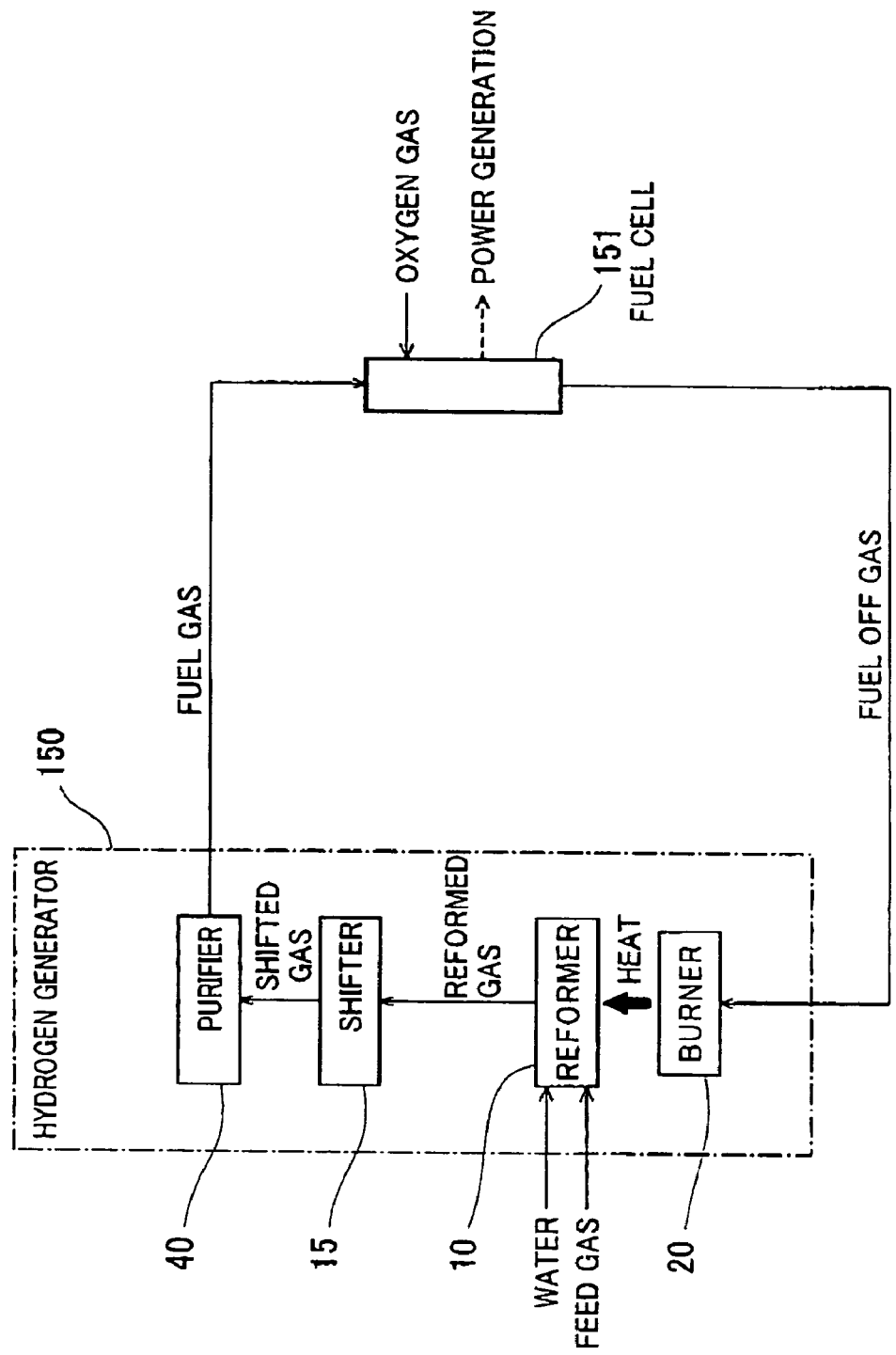
FIG. 5 is a schematic view showing a construction of a fuel cell power generation system according to the first embodiment of the present invention, comprising the hydrogen generator in FIG. 1.

FIG. 1 is a schematic cross-sectional view showing a construction of a hydrogen generator according to a first embodiment of the present invention. FIGS. 2 and 3 are partially enlarged cross-sectional views schematically showing a structure of a second evaporator of the hydrogen generator in FIG. 1. FIG. 5 is a schematic view showing a construction of a fuel cell power generation system according to the first embodiment of the present invention, comprising the hydrogen generator in FIG. 1.

In this embodiment, first of all, the hydrogen generator will be described, and then, the fuel cell power generation system comprising the hydrogen generator will be described.

[Hydrogen Generator]

As shown in FIG. 1, the hydrogen generator mainly comprises a cylindrical body 50 having upper and lower ends closed, a burner 20 to which a cylindrical radiation tube 21 is attached, and a heat-insulating material 53 that covers an outer periphery of the body 50. Hereinafter, a construction of the hydrogen generator will be described in detail.

The burner 20 with the radiation tube 21 is contained and disposed concentrically with the body 50. In the interior of the cylindrical body 50, specifically, a space between an inner wall of the body 50 and the radiation tube 21, a plurality of vertical walls 102 and a plurality of horizontal walls 103 are provided. The vertical walls 102 are concentrically cylindrical and have dimensions varying in radial and axial direction. The horizontal walls 103 are suitably provided at predetermined end portions of the vertical walls 102 and have a circular-plate shape or a hollow circular-plate shape. More specifically, in the interior of the body 50, the plurality of vertical walls 102 are vertically provided concentrically with one another so as to have gaps 51 between them. The horizontal walls 103 suitably close the predetermined end portions of the vertical walls 102 to allow desired gas flow passages to be formed by utilizing the gaps 51. Thus, in the interior of the body 50, a reformer 10, a Shifter 15, and gas flow passages to be described later are formed.

The gas flow passages are each ring-shaped in a cross-section taken along I-I' in a radial direction of the body 50, and are arranged in the following order in the direction from outside to inside: a downstream flow passage 4A of a combustion gas flow passage 4 having a twofold structure, an upstream flow passage 1A and a downstream flow passage 1B of a material flow passage 1 having a twofold structure, a reformed gas flow passage 2, the reformer 10, and an upstream flow passage 4B of the combustion gas flow passage 4. As used herein, "upstream" and "downstream" refers to a direction in gas flow. The downstream flow passage 4A and the upstream flow passage 4B of the combustion gas flow passage communicate with each other at a bottom portion through the radially extending flow passage formed by the horizontal wall 103. The upstream flow passage 4B is connected at an end portion thereof to the burner 20 with the radiation tube 21 and the downstream flow passage 4A communicates with outside through an exhaust gas outlet 8. The upstream flow passage 1A and the downstream flow passage 1B of the material flow passage 1 communicate with each other at the bottom portion through the radially extending, flow passage formed by the horizontal wall 103. This bottom portion is a first evaporator 9. As described later, water is supplied to the first evaporator 9 through the upstream flow passage 1A, and first steam is generated there. The first steam moves along the downstream flow passage 1B. Herein, the flow passage for the first steam which is formed by the upstream flow passage 1A and the downstream flow passage 1B is called a first steam flow passage 1D.

The reformer 10 is cylindrical and is disposed so as to enclose a side portion and an upper portion of the radiation tube 21 with the upstream flow passage 4B of the combustion gas flow passage 4 disposed between the reformer 10 and the radiation tube 21. Above the reformer 10 in the axial direction of the body 50, a downstream flow passage 1C of the material flow passage 1 is formed along an upper end face of the reformer 10 by the horizontal wall 103. The downstream flow passage 1C radially extends and is fluidically connected to the downstream flow passage 1B of the material flow passage 1. The downstream end portion of the material flow passage 1 is fluidically connected to the upper end face of the reformer 10. The downstream flow passage 1B of the material flow passage 1 extends upward beyond the reformer 10 and an extended portion of the downstream flow passage 1B forms a second steam flow passage 30, as will be described later. Therefore, the second steam flow passage 30 is fluidically connected to the material flow passage 1.

The Shifter 15 is disposed above the reformer 10 so as to be opposed to the upper end face of the reformer 10. The Shifter 15 fluidically communicates with the reformer 10 through the reformed gas flow passage 2. The reformed gas flow passage 2 extends axially so as to enclose the outer periphery of the reformer 10 and is structured such that an upstream end portion thereof is fluidically connected to a lower end portion of the reformer 10, and a downstream region thereof extends radially along an upper end face of the Shifter 15. And, a lower end ace of the Shifter 15 and the horizontal wall 103 form a shifted gas flow passage 3. An upstream end portion of the shifted gas flow passage 3 communicates with the Shifter 15 and a downstream end portion thereof communicates with a Purifier 40 (FIG. 5) through a shifted gas outlet 7.

The upstream flow passage 1A of the material flow passage 1 is connected to a material feed portion 5 and a first water supply portion 6. Although not shown, the material feed portion 5 comprises a material fled device and a material feed pipe, and the first evaporator 6 comprises a water supply unit and a water supply pipe. The second steam flow passage 30 is connected to a second water supply portion 32. Although not shown, the second water supply portion 32 comprises a water supply unit and a water supply pipe. The burner 20 installed on the body 50 is provided with a combustion air inlet 20a and a combustion fuel gas inlet 20b. Although not shown, the air inlet 20a is connected to the air supply portion and the combustion fuel gas inlet 20b is connected to the combustion gas supply portion.

The reformer 10 is structured such that a carrier made of metal oxide molded in granule which carries platinum group metal as a reforming catalyst thereon is filled in the gap 51 formed between the vertical walls 102. The reformer 10 is located inward relative to the material flow passage 1 and the reformed gas flow passage 2 in the generator. An upper end face of the reformer 10 is fluidically connected to the material flow passage 1 and a lower ace thereof is fluidically connected to the reforming gas flow passage 2.

The Shifter 15 is structured such that platinum group metal as a shift catalyst is carried in a dispersed state on a carrier comprised of metal oxide film which is formed on a honeycomb substrate made of ceramic. The Shifter 15 is provided with a temperature sensor 33 configured to detect a temperature of the interior of the Shifter 15. Temperature information indicative the temperature of the Shifter 15 which is detected by the temperature sensor 33 is transmitted to a control device 35. And, the control device 35 is configured to control the second water supply portion 32 based on this information to enable adjustment of a flow rate of the water supplied from the second water supply portion 32 to the second steam flow passage 30, as will be described later.

The body 50 and the burner 20 are configured such that outer peripheral portions other than the shifted gas outlet 7, the exhaust gas outlet 8, the air inlet 20a, the combustion fuel gas inlet 20b, the material feed portion, and a connecting portion with the material feed portion 5 and the first and second water supply portions 6 and 32, are covered with a heat insulating material 53.

The downstream flow passage 1B of the material flow passage 1 extends through a connecting portion (hereinafter referred to as a flow-direction change portion) between the downstream flow passage 1B and the downstream flow passage 1C, where a feed gas mixture changes its flow direction, and extends axially upward beyond the Shifter 15. And, the extended end portion of the downstream flow passage 1B is disposed adjacent the reformed gas flow passage 2 formed along the upper end face of the Shifter 15 with the horizontal wall 103 disposed between the passage 2 and the passage 1B. As defined herein, a portion of the downstream flow passage 1B of the material flow passage 1, which is located closer to the Shifter 15, i.e., on the upper side, relative to the flow-direction change portion, is called a second steam flow passage 30.

The second evaporator 31 is formed within the second steam flow passage 30 adjacent the reformed gas flow passage 2 with the horizontal wall 103 disposed between the reformed flow passage 2 and the evaporator 31. The second evaporator 31 is configured to reserve the water supplied from the second water supply portion 32. For example, the second evaporator 31 is formed by a container comprised of a bottom surface and a side surface extending from an outer periphery of the bottom surface and having a predetermined depth is disposed within the second steam flow passage 30. As described with reference to FIG. 2, in the second evaporator 31, a bottom surface 34 of the container forms a water evaporation surface, and water flows from a water outlet 32c of the supply pipe 32a of the second water supply portion 32 toward the bottom surface 34.

FIG. 2 is a partially enlarged view showing a structure of the second evaporator 3 and the second water supply portion 32. As shown in FIG. 2, a tip end portion 32b of the supply pipe 32a of the water supply portion 32 is provided vertically relative to the bottom surface 34 of the second evaporator 31. A distance h between the bottom surface 34 and the water outlet 32c of the tip end portion 32b is set smaller than a diameter of a water droplet formed at the water outlet 32c and dropping toward the bottom surface 34. Thereby, the water is supplied to the second evaporator 31 located below to be spaced apart from the tip end portion 32b in such a manner that water droplets do not fall toward the bottom surface 34 of the second evaporator 31, but the water is supplied to the bottom surface 34 smoothly due to a surface tension between the water and the bottom surface 34. In other words, the water droplets are not intermittently supplied, but a predetermined amount of water can be continuously supplied to the bottom surface 34 as an evaporation surface.

If the water droplets are intermittently supplied to the bottom surface 34 of the second evaporator 31, then the amount of water evaporated in the second evaporator 31 varies periodically, thereby causing a pressure fluctuation within the generator. The pressure fluctuation causes a ratio between the amount of steam and the reforming feed gas to be supplied to the reformer 10 to vary. As a result, the amount of hydrogen contained in the reformed gas generated in the reformer 10 or the amount of CO generated as by-product in the reforming reaction vanes.

On the other hand, by setting the distance h between the bottom surface 34 of the second evaporator 34 and the water outlet 32c of the supply pipe 32a of the water supply portion 32 as described above, a constant amount of water is supplied to the bottom surface 34 continuously due to the surface tension as described above. Thus, the amount of water evaporated in the second evaporator 31 can be stabilized. Thereby, the pressure fluctuation can be avoided. As a result, the amount of hydrogen or CO contained in the reformed gas generated in the reformer 10 can be stabilized. By continuously supplying the water, an impact caused by the water droplets accelerated by gravity, is not applied to the bottom surface 34. For this reason, in spite of a longtime operation of the hydrogen generator, it is possible to inhibit occurrence of local damage or deformation of the bottom surface 34 of the second evaporator 31. As a result, the reforming reaction can be carried out stably in the reformer 10.

From experiments, it was confirmed that the diameter of the water droplets falling from the water outlet 32C is in a range of 1 to 5 mm. Therefore, the distance h between the water outlet 32c and the bottom surface 34 of the second evaporator 31 is set smaller than the above range. This makes it possible for the water to be continuously supplied. Such a structure is obtained by, for example, setting a flow cross-sectional area of the supply pipe 32a of the water supply portion 32, in particular, a flow cross-section area of the water outlet 32c, smaller than the diameter of the water droplets. Herein, a hole diameter of the water outlet 32c is set to 0.5 to 5 mm. The flow cross-sectional area of the entire supply pipe 32a may be set, or otherwise the flow cross-sectional area of only the tip end portion 32b of the supply pipe 32a may be set smaller than that of the other portion.

The water is supplied from the second water supply portion 32 to the second evaporator 31 at a flow rate of approximately 0.1 to 2 g/min. It is extremely difficult to continuously supply such a small amount of water using a supply unit (not shown) such as a pump. In order to supply such a small amount of water, the supply unit of the second water supply portion 32 is operated intermittently in certain cycles to allow water to be introduced to the supply pipe 32a. Assuming that the water introduced intermittently from the supply unit to the supply pipe 32a is supplied intermittently to the second evaporator 31 in the certain cycles, the amount of steam varies periodically and pulsatively in the second evaporator 31. And, with this variation, the pressure fluctuation occurs within the generator, which may lead to variation in the amount of hydrogen or CO generated as byproduct in the reformer 10.

Accordingly, in order to inhibit pulsative variation in the amount of steam generated in the second evaporator 31, the water introduced intermittently from the supply unit of the second water supply portion 32 to the supply pipe 32a must be caused to flow continuously therein to allow the water to be continuously supplied to the second evaporator 31. To this end, the inner diameter of the supply pipe 32a of the second water supply portion 32 is set to 1 to 5 mm, and a flow cross-sectional area of the supply pipe 32a is set to 0.7 to 20 mm$^2$ so as to correspond to the inner diameter of the supply pipe 32a. The inner diameter and flow cross-sectional area of the entire supply pipe 32a may be set, or otherwise, the inner diameter and flow cross-sectional area of the tip end portion 32b of the supply pipe 32a may be set smaller than those of the other portion. With this setting, the water introduced intermittently to the supply pipe 32a flows gradually within the pipe 32a, and for example, in at least the tip end portion 32b, the water flows continuously rather than intermittently.

It should be appreciated that, when the inner diameter of the supply pipe 32a is less than 1 mm, the interior of the pipe 32a tends to be dogged with unwanted objects contained in water. Also, when the second water supply portion 32 or its vicinity is heated, the supply pipe 32a is likely to be distorted due to thermal stress, and may be dogged due to such deformation And, due to thermal expansion of the unwanted objects or the like, the interior of the supply pipe 32a tends to be clogged. In such cases, supply of the water to the second evaporator 3 is stopped or the pressure of water supply must be increased, which increases a load on the supply unit. On the other hand, by setting the diameter of the supply pipe 32a larger than 5 mm, the water being supplied at a flow rate of approximately 0.1 to 2 g/min does not flow evenly within the entire pipe 32a but flows along a part of the pipe 32a. This causes intermittent flow of water.

Further, in the structure in which the tip end portion 32b of the supply pipe 32a of the second water supply portion 32 is provided vertically relative to the bottom surface 34 of the second evaporator 31, if the distance h between the water outlet 32c of the tip end portion 32b and the bottom surface 34 becomes too small due to deformation of the supply pipe 32 or the like, then water flowing from the water outlet 32c toward the bottom surface 34, may become stagnant. Accordingly, it is desirable to form a cutout 36 in the tip end portion 32b of the supply pipe 32a. In the structure shown in FIGS. 3A and 3B, a part of a pipe wall of the tip end portion 32b of the supply pipe 32a is cut out in the shape of triangle or parabola, thereby forming the cutout 36. The provision of the cutout 36 in the tip end portion 32b allows the water to flow through the cutout 36 of the tip end portion 32b even when the tip end portion 32b makes contact with the bottom surface 34 of the evaporator 31. It should be appreciated that the shape of the cutout 36 formed in the tip end portion 32b is not intended to be limited to those shown in FIGS. 3A and 3B. Instead of removing the part of the pipe wall from the tip end portion 32b, a predetermined region of the pipe wall of the tip end portion 32b may be removed over the circumference thereof, thereby making the tip end portion 32b entirely pointed.

Subsequently, an operation of the hydrogen generator will be described.

The fuel gas is supplied to the burner 20 through the combustion fuel gas inlet 20b and air is supplied to the burner 20 through the combustion air inlet 20a. As described later with reference to FIG. 5, herein, an excess fuel (fuel off gas) which remains unused in a fuel cell 151 of a fuel cell power generation system is used as the combustion fuel gas. And, the fuel off gas and air are used to conduct diffusion combustion. Since the burner 20 is enclosed by the radiation tube 21, combustion is conducted within the radiation tube 21, thereby generating a high-temperature combustion gas. Heat of the combustion as is transmitted, through the radiation tube 21, radially outward in the body 50 by radiation. The combustion gas moves axially upward within the radiation tube 21. The reforming catalyst of the reformer 10 is heated by both the radiation heat and a combustion gas flowing axially upward within the radiation tube 21. Thereby, the reformer 10 can be kept at a temperature of 550 to 800° C. Then, the combustion gas moves axially downward along the vertical wall 102 within the upstream flow passage 4B of the combustion gas flow passage 4. Further, the combustion gas moves axially upward within the downstream flow passage 4A, and is finally discharged outside from the exhaust gas discharge port 8 as indicated by an arrow i. As described later, while the combustion gas is moving within the combustion gas flow passage 4, heat is exchanged between the combustion gas and the water flowing within the material flow passage 1 in such a manner that the heat of the combustion gas is used as evaporation latent heat in the first evaporator 9.

A feed gas (e.g., a hydrocarbon gas such as a city gas and LP gas or alcohol such as methanol) comprising a compound containing at least carbon and hydrogen which is supplied from the material feed portion 5 and water supplied from the first water supply portion 6 are sent to the reformer 10 through the material flow passage 1 as a reforming reaction material. Here, the feed gas and water respectively supplied from the supply portions 5 and 6 move axially downward along the vertical wall 102 in different states, i.e., a gaseous state and a liquid state within the upstream flow passage 1A of the material flow passage 1 (arrow a). And, in the bottom portion of the upstream flow passage 1A, i.e., the first evaporator 9, the water is evaporated into steam by the heat retained by and radiated from the combustion gas and heat from the reformer 10. The steam generated in the first evaporator 9 is called first steam. The first stream is mixed with the feed gas, and the resulting mixture gas axially upward along the vertical wall 102 within the downstream flow passage 1B (arrow b). And, the mixture gas flows into the downstream flow passage 1C of the material flow passage 1 formed along the upper end face of the reformer 10, within which the gas moves inward along the horizontal wall (represented by 103a), and thereafter, is supplied to the reformer 10 (represented by an arrow c).

The feed gas and the first steam are introduced from the upper end face of the reformer 10 to the inside thereof. Inside the reformer 10, the feed gas and the first steam moves within the reforming catalyst axially downward along the vertical wall 102 (arrow d). While moving within the reforming catalyst, the first steam and the feed gas are heated up and elevate in temperature. Under this condition, a reforming reaction is conducted and a reformed gas is generated. The reformed gas contains hydrogen as major component and also contains CO as a by-product resulting from the reforming reaction And, the reformed gas flows from a lower end face of the reformer 10 into the reformed gas flow passage 2 and flows axially upward along the vertical wall 102 within the reformed gas flow passage 2 (arrow e). Then, the reformed gas moves along the horizontal wall 103 within the reformed gas flow passage 2 and reaches the Shifter 15 (arrow f).

The reformed gas supplied to the Shifter 15 moves axially downward within a shift catalyst. During this time, a reaction in which CO contained in the reformed gas is shifted into $CO_2$, shift reaction, is conducted, thereby generating a shifted gas. The shift reaction is an exothermic reaction. The shifted gas flows vertically downward from a downstream face of the Shifter 15 to the shifted gas flow passage 3 (arrow g). Then, the shifted gas flows along the horizontal wall 103 (103a) within the flow passage 3, and moves axially upward along the vertical wall 102 within the flow passage 3 and is discharged from a shifted gas outlet 7 (arrow h). The shifted gas discharged from the shifted gas outlet 7 is sent to a Purifier 40, as described with reference to FIG. 5.

While the reformed gas is moving within the rearmed gas flow passage 2, water is supplied from the second water supply portion 21 to the second steam flow passage 30. In detail, as shown in FIG. 2, the water is introduced from the supply unit (not shown) of the second water supply portion 32 to the supply pipe 32a, and is continuously supplied to the second evaporator 31 within the second steam flow passage 30 as described above. Here, the amount of water supplied from the second water supply portion 32 to the second steam flow passage 30 is not more than ⅕ the amount of water supplied from the first water supply portion 6 to the material flow passage 1. The water supplied to the second evaporator 31 in the manner described above is stored in the second evaporator 31.

Since the second evaporator 31 is located adjacent the reformed gas flow passage 2 with the horizontal wall 103 interposed between them, a part of heat of the reformed gas flowing within the reformed gas flow passage 2 is transmitted to the second evaporator 31 through the horizontal wall 103 and used as an evaporation latent heat in the second evaporator 31. Since the part of heat is recovered as the evaporation latent heat, the reformed gas having a high temperature approximately equal to that of the reformer 10 is cooled. In addition, the radiation heat from an upstream surface of the Shifter 15 is transmitted to the second evaporator 31 through the reformed gas flow passage 2 and used as the evaporation latent heat. Thus, regardless of heat generation in the shift reaction within the Shifter 15, the Shifter 15 can be kept at an optimal temperature for the shift reaction, i.e., 180 to 400° C. As a result, in the Shifter 15, the shift reaction is carried out stably and efficiently to remove Co.

A temperature sensor 33 detects the temperature of the Shifter 15. Based on this temperature information, a control device 35 controls the amount of water supplied from the second water supply portion 32. Specifically, when the temperature of the Shifter 15 is lower than an optimum temperature or the shift reaction, the control device 35 controls the second water supply portion 32 to cause the amount of water supplied from the second water supply portion 32 to decrease. For example, when the second water supply portion 32 has a feed pump and valves adapted to open and close supply flow passages, the control device 35 decreases the output of the pump or closes the valve, thereby decreasing the amount of water supply. So, the amount of water supplied to the second evaporator 31 decreases, and corresponding the amount of heat of the reformed gas recovered as the evaporation latent heat in the second evaporator 31 decreases. As a result, the reformed gas having high calories is supplied to the Shifter 15, which thereby increases its temperature.

On the other hand, when the temperature of the Shifter 15 is higher than the optimum temperature for the shift reaction, the control device 35 controls the second water supply portion 32 to cause the water supplied from the second water supply portion 32 to increase. For example, the control device 35 increases the output of the pump or increases an opening degree of the valve, thereby increasing the amount of water supply. This increases the amount of water supplied to the second evaporator 31, and hence increases heat of the reformed gas recovered by the second evaporator 31. As a result, the reformed gas that has cooled and hence has low calories, is supplied to the Shifter 15. Thus, it is possible to inhibit a temperature increase in the Shifter 15.

Since water evaporation in the second evaporator 31 is pool boiling in which heating is conducted from below, bumping is avoided. Therefore, it is possible to inhibit occurrence of the pressure fluctuation in the generator. As a result, as described above, especially, it is possible to generate the reformed gas stably in the reformer 10. In addition, an event that the metal ions dissolved in water or the like fly and enter the reformer 10 or the Shifter 15 when bumping occurs can be avoided. For example, when metal ions enter the reformer 10 or the Shifter 15 upon occurrence of the bumping, the metal ions are adsorbed in catalysts, which loses its activity, thereby degrading durability of the hydrogen generator. In this embodiment, on the other hand, since the bumping is inhibited in the hydrogen generator, the metal ions contained in water are inhibited from flying. Thus, durability of the generator is improved.

Since the amount of water supplied from the second water supply portion 32 is as small as not more than $1/5$ the amount of water supplied from the first water supply portion 6, the pressure of the second steam generated in the second evaporator 31 is a little in contrast to the pressure of the first steam generated in the first evaporator 9. Therefore, the second steam does not substantially affect a pressure ratio between the feed gas and steam supplied to the reformer 10. For this reason, even when the amount of water supplied to the second evaporator 31 is adjusted to allow the amount of the second steam to vary so that temperature of the Shifter 15 is controlled, the reforming reaction is carried out stably in the reformer 10.

The second steam generated in the second evaporator 31 moves along the horizontal wall 103 within the second steam flow passage 30, and then flows axially downward along the vertical wall 102. Further, the second steam enters the downstream flow passage 1C of the material flow passage 1, and moves along the horizontal wall 103 (103a) together with the mixture gas moving within the downstream flow passage 1B to be supplied to the reformer 10. While the second steam is flowing within the second steam flow passage 30, heat is transferred from the shifted gas to the second steam, thus recovering heat, because of the structure in which the second steam flow passage 30 is located adjacent the shifted gas flow passage 3 with the horizontal wall 103a and the vertical wall 102 interposed between them. Also, since the downstream flow passage 1C of the material flow passage 1 is opposed to a downstream face of the Shifter 15 with the shifted gas flow passage 3 interposed between them, heat is transferred to the steam by heat radiation from the Shifter 15, thus recovering heat.

If the water supplied from the second water supply portion 32 partially remains unevaporated in the water second evaporator 31, such water moves within the second steam flow passage 30. Further, the water moves within the downstream flow passage 1B of the material flow passage 1 and reaches a bottom portion of the flow passage 1, i.e., the first evaporator 9. This water is evaporated in the first evaporator 9 similar to the water supplied from the first water supply portion 6. The resulting steam is supplied to the reformer 10 through the downstream flow passage 1B and 1C. As should be appreciated, even when the water remains unevaporated in the second evaporator 31, the water is not directly supplied to the reformer 10. Therefore, generation efficiency of the reformed gas in the reformer 10 is not reduced. In this case, heat is also recovered from the reformed gas by the water remaining unevaporated in the second evaporator 31 and flowing.

[Fuel Cell Power Generation System]

As shown in FIG. 5, a fuel cell power generation system according to the first embodiment of the present invention comprises a hydrogen generator 150 in FIG. 1 and a fuel cell 151. In the hydrogen generator a CO concentration of the shifted gas resulting from the shift reaction is reduced to a concentration as high as $1/5$ to $1/50$ the CO concentration of the reformed gas, according to a temperature of the shift reaction. Still, the CO concentration is required to be decreased to 10 ppm or lower for the gas to be used in the fuel cell 151 as a fuel gas. To this end, as shown in FIG. 5, in the hydrogen generator 151 used in the fuel cell power generation system, the shifted gas is sent to the Purifier 40 located downstream of the Shifter 15 and treated therein. And, in the fuel cell power generation system, the gas containing hydrogen as a major component which is derived from the hydrogen generator 150 is supplied to a fuel electrode of the fuel cell 151 as the fuel gas. The fuel cell 151 uses the fuel gas supplied to the fuel electrode and oxygen supplied to an oxygen electrode to generate an electric power. And, the fuel gas remaining unused after this reaction is supplied to the burner 20 of the hydrogen generator 150 as an off gas, and combusted therein.

In accordance with this embodiment, since the hydrogen generator is configured such that heat of the reformed gas supplied to the Shifter 15 is recovered by using the water supplied to the second evaporator 31, heat exchange rate between the water liquid) and the reformed gas (gas) is higher than heat exchange rate between gases, for example, heat exchange between the fuel off gas, the air, or the combustion gas and the reformed gas, or between the feed gas or steam for the reforming reaction and the reformed gas. Thus, recovered heat increases. A result, thermal efficiency of the entire system increases.

Furthermore, since temperature adjustment of the Shifter 15 is carried out by controlling the amount of water supplied from the second water supply portion 32, which is not substantially affected by other parts of the generator, the temperature of the Shifter 15 is less susceptible to variation in conditions of the other parts of the generator, unlike in the conventional system. In particular, even when a load of the amount of hydrogen generation in the reformer 10 varies, high controllability is gained, in contrast to a case where temperature control is carried out based on, for example, fuel off gas, air, or combustion gas, which varies its state according to load fluctuation of the amount of hydrogen generation.

In the fuel cell power generation system comprising the hydrogen generator capable of increasing efficiency of heat recovery and of improving temperature controllability of the Shifter 15, thermal efficiency in the entire system increases and thus, high energy efficiency is achieved. Simultaneously, highly durable system is achieved.

While the reformer 10 is structured such that platinum group metal is carried on a carrier made of metal oxide molded in the form of particle, the structure of the reformer 10 is not intended to be limited to this. For example, the reformer 10 may be structured such that platinum group metal is dispersed on a carrier comprised of metal oxide film which is formed on a honeycomb substrate made of ceramic or metal.

While the Shifter 15 is structured such that platinum group metal is dispersed on a carrier comprised of metal oxide film which is formed on the honeycomb substrate made of ceramic, the structure of the Shifter 15 is not intended to be limited to this. For example, the Shifter 15 may be structured to have a substrate formed by a metal thin plate made of stainless or the like. Alternatively, depending on the shape of the Shifter 15, the Shifter 15 may structured to be filled with a carrier made of metal oxide molded in the form of particle which carries platinum group metal thereon.

In a further alternative, other than the platinum group metal a base metal such as Cu or Zn may be used as the shift catalyst of the Shifter 15.

When the platinum group metal is used as the shift catalyst of the Shifter 15, it is possible to increase the temperature of the Shifter 15, due to the fact that the shift catalyst made of the platinum group metal has heat resistance higher than that made of the base metal. In the Shifter 15 having such high heat resistance, since the amount of water supplied from the second water supply portion 32 can be controlled flexibly, variation margin of the amount of water supply may be large. On the other hand, when the base metal is used as the shift catalyst of the Shifter 15, available temperature range becomes small because the base metal has heat resistance lower than that of the platinum group metal Nonetheless, in this embodiment, high controllability is achieved in the Shifter 15, and therefore, the effects of this embodiment are obtained While the second steam generated in the second evaporator 31 is mixed with the first steam generated in the first evaporator 9, and the resulting mixed steam is supplied to the reformer 10 through the material flow passage 1C, the first steam generated in the first evaporator 9 and the second steam generated in the second evaporator 31 may be respectively supplied to the reformer 10 through separate flow passages.

While the tip end portion 32b of the supply pipe 32a is provided vertically relative to the water evaporation surface 34 of the second evaporator 31, the placement of the supply pipe 32a is not intended to be limited to this. In an alternative example of this embodiment, the tip end portion 32a may extend in parallel with the water evaporation surface 34.

Embodiment 2

[Hydrogen Generator]

Figure 4:
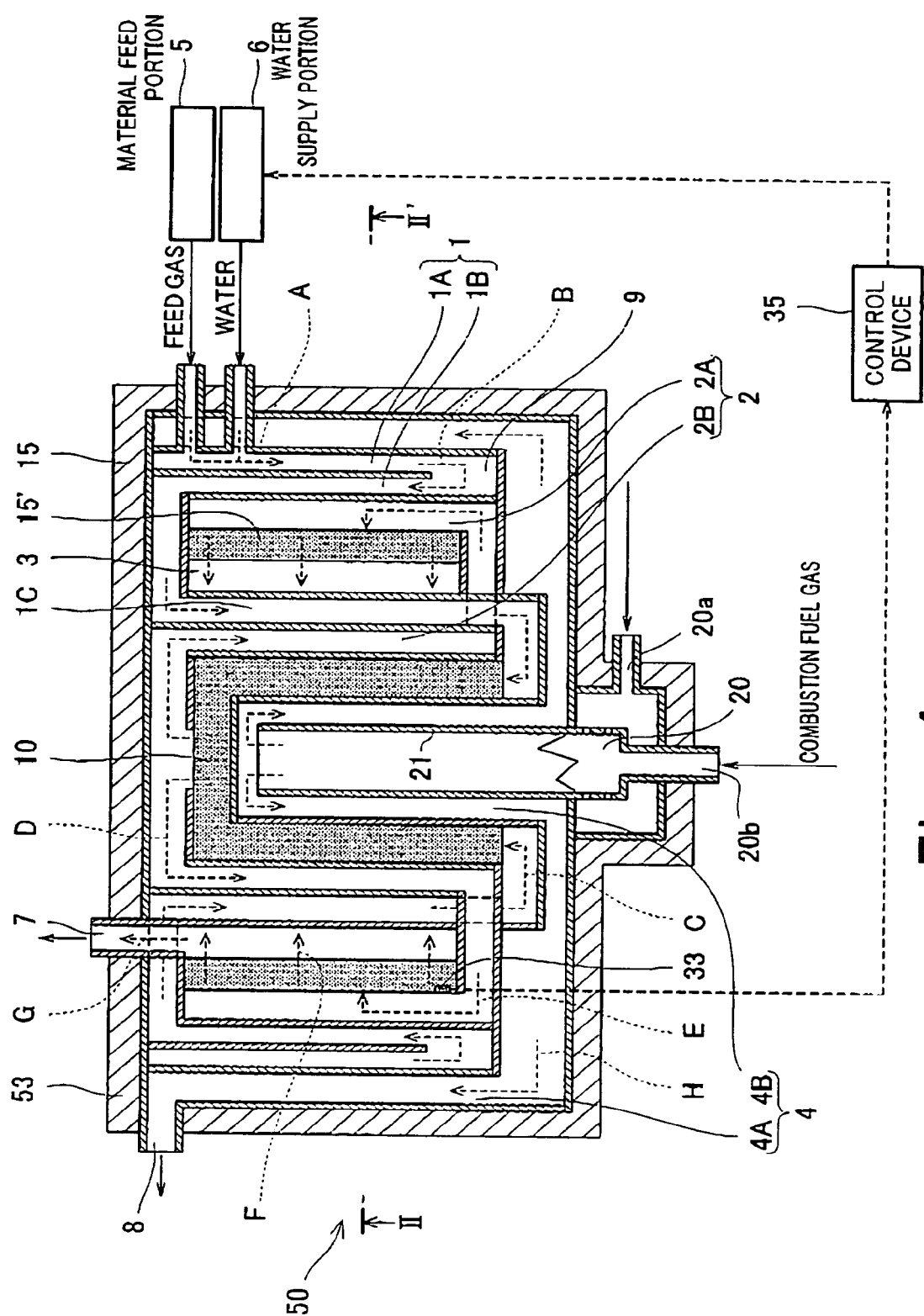
FIG. 4 is a schematic cross-sectional view showing a construction of a hydrogen generator according to a second embodiment of the present invention.

FIG. 4 is a cross-sectional view schematically showing a construction of a hydrogen generator according to a second embodiment of the present invention. The hydrogen generator of this embodiment differs from the hydrogen generator of first embodiment in the following respects.

In the first embodiment, the Shifter 15 is located above the reformer 10 in the axial direction of the generator, while in this embodiment, as shown in FIG. 4, a cylindrical Shifter 15' is located radially outward relative to the reformer 10 so as to enclose an outer periphery of the reformer 10, and the reformed gas flow passage 2 facing the Shifter 15' is located adjacent the downstream flow passage 1B of the material flow passage 1 and the evaporator 9. While in the first embodiment, the first and second evaporators 9 and 31, and the first and second water supply portions 6 and 32 are provided, in this embodiment, the evaporator 9 and the water supply portion 6 are provided.

More specifically, as in the fist embodiment, in the interior of the cylindrical body 50 having closed upper and lower ends, the vertical walls 102 and horizontal walls 103 are provided, thereby forming the cylindrical reformer 10 that enclose the burner 20 provided with the radiation tube 21. And, cylindrical gas flow passages which are ring-shaped in cross-section taken along line II-II' in the radial direction of the generator, and the Shifter 15 enclose the reformer 10. Herein, the downstream flow passage 4A of the combustion gas flow passage 4 having a twofold structure, the upstream flow passages 1A and 1B of the material flow passage 1 having a threefold structure, the downstream flow passage 2A of the reformed gas flow passage 2 having a twofold structure, the Shifter 15', the shifted gas flow passage 3, the downstream flow passage 1C of the material flow passage 1, the upstream flow passage 2B of the reformed gas flow passage 2, the reformer 10, and the upstream flow passage 4B of the combustion gas flow passage 4 are arranged in this order from outside to inside of the generator. The multi-fold flow passages are configured such that the flow passages axially extending communicate with one another at the bottom or the top through the flow passages formed by the horizontal walls 103 radially extending.

The combustion gas flow passage 4 is configured such that an end portion of the upstream flow passage 4B is fluidically connected to the burner 20 provided with the radiation tube 21 and an end portion of the downstream flow passage 4A communicates with outside through the exhaust gas outlet 8. The material flow passage 1 is configured such that an end portion of the upstream flow passage 1A is connected to the material feed portion 5 and the water supply portion 6, and an end portion of the downstream flow passage 1C is fluidically connected to a lower end face of the reformer 10. And, the evaporator 9 is formed at the bottom portion where the upstream flow passage 1A and the upstream flow passage 1B are fluidically connected to each other. The reformed gas flow passage 2 is configured such that an end portion of the upstream flow passage 2B is fluidically connected to an upper end face of the reformer 10 and an end portion of the downstream flow passage 2A is fluidically connected to an upstream face of the Shifter 15'. The shifted gas flow passage 3 is configured such that an upstream end portion is fluidically connected to a downstream face of the Shifter 15' and a downstream end portion thereof communicates with the Purifier 40 (FIG. 5) through the shifted gas outlet 7.

In this embodiment, the Shifter 15' is structured such that a carrier comprised of metal oxide molded in the form of particle which caries platinum group metal thereon is filled in a cylindrical region located between the reformer gas flow passage 2 and the shifted gas flow passage 3, unlikely the Shifter 15 of first embodiment structured such that platinum group metal is carried on a carrier comprised of metal oxide film which is formed on the honeycomb substrate made of ceramic. A temperature sensor 33 is provided in the Shifter 15', and based on temperature information from the temperature sensor 33, the control device 35 adjusts temperature of the Shifter 15'.

In this embodiment, the feed gas and the water are supplied from the material feed portion 5 and the water supply portion 6 to the upstream flow passage A of the material flow passage 1. The feed gas and the water flows axially downward along the vertical wall 102 within the flow passage 1A (see arrow A). And, in the evaporator 9 at the bottom portion of the flow passage 1A, radiation heat from the reformer 10 and heat from a combustion gas within the combustion gas flow passage 4A are transferred to the water. In addition, as described later, heat retained by the reformed gas within the reformed gas flow passage 2 located adjacent the evaporator 9 with the vertical wall 102 interposed between them, and radiation heat from the upstream face of the Shifter 15' are transferred to the water. These heats are used as evaporation latent heat to evaporate water in the evaporator 9. The resulting steam is mixed with the feed gas, and a mixture of the steam and the feed gas, i. e., a mixture gas flows axially upward along the vertical wall 102 within the upstream flow passage 1B (arrow B). Thereafter, the mixture gas flows into the downstream flow passage 1C and flows axially downward along the vertical wall 102 within the downstream flow passage 1C. And, the mixture gas is supplied from a lower end of the reformer 10 to an inside of the reformer 10 (arrow C). While the mixture gas is flowing axially upward along the vertical wall 102 within the reformer 10, rearming reaction is conducted, thereby generating a reformed gas containing hydrogen as major component.

The reformed gas flows axially downward along the vertical wall 102 within the upstream flow passage 2B of the reformed gas flow passage 2. Then, the reformed gas flows axially upward along the vertical wall 102 within the downstream flow passage 2A (arrows D and E) and reaches an upstream face of the Shifter 15'. The reformed gas supplied to the Shifter 15' flows inward in the radial direction of the tubular Shifter 15' within the body, i.e., in the direction (arrow F) perpendicular to a center axis (not shown) of the hydrogen generator. During this time, the shift reaction is conducted to generate the shifted gas. Since the shift reaction is an exothermic reaction, the Shifter 15' is heated by the heat retained by the reformed gas and heat generated in the shift reaction.

While the reformed gas is approaching the Shifter 15', a part of the heat of the reformed gas is used as evaporation latent heat of the water in the evaporator 9 located adjacent the reformed gas flow passage 2 with the vertical wall 102 interposed between them. Thereby, heat is recovered from the reformed gas which is thereby cooled. The radiation heat from the upstream face of the Shifter 15' passes through the reformed gas flow passage 2 and is transferred to the evaporator 9 through the vertical wall 102, where this heat is used and recovered as water evaporation latent heat in the evaporator 9. In this embodiment, by using a part of the heat of the reformed gas and the radiation heat from the upstream face of the Shifter 15' to evaporate water, the Shifter 15' is adjusted to be kept at an optimum temperature, as in the first embodiment.

As in the first embodiment, the temperature sensor 33 detects the temperature of the Shifter CO 15', and based on this temperature information, the control device 35 controls the amount of water supplied from the water supply portion 6. Thereby, the amount of heat retained by the reformed gas and the amount of radiation heat of the Shifter 15', i.e., the amount of heat recovered by the evaporator 9, are adjusted. As s result, temperature control of the Shifter 15 is carried out.

Specifically, when the temperature of the Shifter 15' is lower than an optimum temperature for the shift reaction, the control device 35 controls the water supply portion 6 to cause the amount of water supplied from the second water supply portion 6 to decrease. For example, when the water supply portion 6 has a feed pump and valves adapted to open and close feed flow passages, the control device 35 decreases the output of the pump or closes the valve, thereby decreasing the amount of water supply. So, the amount of water supplied to the evaporator 9 decreases, and correspondingly the amount of heat of the reformed gas recovered by the evaporator 9 decreases. As a result, heat of the reformed gas recovered by the evaporator 9 decreases. Therefore, the reformed gas having high calories is supplied to the Shifter 15', which thereby elevates in temperature.

On the other hand, when the temperature of the Shifter 15' is higher than an optimum temperature for the shift reaction, the control device 35 controls the water supply portion 6 to cause the water supplied from the water supply portion 6 to increase. For example, the control device 35 increases the output of the pump or increases an opening degree of the valve, thereby increasing the amount of water supply. This increases the amount of water supplied to the evaporator 9, and hence increases the heat of the reformed gas recovered by the evaporator 9. By increasing the heat from the reformed gas, the reformed gas having less heat is supplied to the Shifter 15', thus inhibiting an increase in the temperature of the Shifter 15'.

The amount of water adjusted for temperature control of the Shifter 15' is a little relative to the amount of water supplied to the reformer 10. The adjustment of the amount of water supply does not substantially affect the ratio between the steam and the feed gas supplied to the reformer 10. Therefore, a pressure fluctuation within the generator is inhibited.

The shifted gas derived from the Shifter 15' flows from the downstream face of the Shifter 15' into the shifted gas flow passage 3 while colliding perpendicularly against the vertical wall 102 of the shifted gas flow passage 3 and the downstream flow passage 1C of the material flow passage 1. During this time, heat is transferred from the shifted gas to the mixture gas flowing within the flow passage 1C by heat conduction, and heat is transferred to the mixture gas flowing within the flow passage 1C by heat radiation from the downstream face of the Shifter 15'. Thus, heat recovery is conducted. Thereafter, the shifted gas flows axially upward along the vertical wall 102 within the shifted gas flow passage 3, and exits the shifted gas outlet 7 (arrow G).

In the embodiment thus constructed, the same effects produced in the first embodiment are obtained.

While in this embodiment, the reformer 10 is structured such that platinum group metal is carried on a carrier made of metal oxide molded in the shape of particle, as in the first embodiment, it may be structured such that platinum group metal is carried in a dispersed state on a carrier comprised of a metal oxide film which is formed on a honeycomb substrate made of ceramic or metal, depending on the shape of the reformer 10.

While in this embodiment, the Shifter 15' is structured such that platinum group metal is carried on a carrier made of metal oxide molded in the shape of particle, this may be structured such that platinum group metal is carried in a dispersed state on a carrier comprised of a metal oxide film which is formed on a substrate made of ceramic or metal honeycomb. In a further alternative, other than the platinum group metal, base metal such as Cu or Zn may be used as the shift catalyst. The effect produced by using the platinum group metal and the base metal as the catalyst have been already described in the first embodiment.

As desired, the Shifter may be disposed along the outer periphery of the reformer 10 as in the second embodiment or may be disposed at a position in the anal direction of the reformer 10 as in the first embodiment. Since efficiency of heat recovery becomes higher as a contact area between the reformed gas flow passage and the evaporator increases, a structure for allowing the contact area to increase is selected as desired. Thus, the effects of the present invention are obtained.

[Fuel Cell Power Generation System]

A fuel cell power generation system according to this embodiment is constructed such that the hydrogen generator 150 of the first embodiment is replaced by the hydrogen generator of this embodiment in the fuel cell power generation system (FIG. 5) of the first embodiment. Thus, the fuel cell power generation system can exhibit the effects of the hydrogen generator of the second embodiment.

While in the first and second embodiments, evaporators are provided in steam flow passages, these evaporators may be provided independently, and the steam flow passages may be connected to these evaporators.

While in the first and second embodiments, the fuel off gas in the fuel cell 151 is used as the combustion fuel gas to be supplied to the burner 20, a hydrocarbon-based fuel such as a city gas, methane, LP gas, coal oil, or hydrogen may be used as the combustion fuel gas.

Other than the cylindrical hydrogen generators of the first and second embodiments, the present invention is applicable to any other hydrogen generator having different shapes.

The hydrogen generator of the present invention is used to generate hydrogen used for various purposes. In particular, the present invention is effective in generating hydrogen used as the fuel gas for the fuel cell. The fuel cell power generation system comprising the hydrogen generator has various uses as a power generator. For example, this system is effective as a home fuel cell cogeneration system.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A hydrogen generator comprising:
   a reformer configured to reform a material using steam supplied from a evaporator that evaporates water supplied from a water supply portion into the steam, to generate a reformed gas containing hydrogen as a major component;
   a material flow passage through which the steam and the material are supplied to the reformer;
   a shifter configured to shift carbon monoxide contained in the reformed gas into carbon dioxide by a shift reaction;
   a reformed gas flow passage through which the reformed gas is sent to the shifter;
   a shifted gas flow passage through which the shifted gas from the shifter flows; and
   a combustor configured to heat the reformer using a combustion gas, wherein:
   the reformed gas flow passage and the evaporator are configured to conduct heat exchange between them,
   a part of heat of the reformed gas flowing through the reformed gas flow passage is used to generate the steam in the evaporator by the heat exchange to allow the reformed gas to be cooled,
   radiation heat from the shifter is transferred to the evaporator through the reformed gas flow passage and used to generate the steam in the evaporator,
   the evaporator comprises a first evaporator and a second evaporator, the first evaporator is configured to evaporate water supplied from a first water supply portion into first steam by the combustion gas derived from the combustor and/or radiation heat of the reformer, and the second evaporator is configured to conduct heat exchange with the reformed gas flow passage, and to evaporate water supplied from a second water supply portion into second steam by using heat of the reformed gas which is recovered by the heat exchange with the reformed gas flow passage, and
   the material flow passage includes a first steam flow passage through which the first steam and the material are supplied to the reformer and a second steam flow passage through which the second steam is supplied to the reformer.

2. The hydrogen generator according to claim 1, wherein the second steam flow passage is connected to the first steam flow passage at a location upstream of the reformer in gas flow.

3. The hydrogen generator according to claim 1, wherein the second evaporator is located above the shifter, and a water evaporation surface of the second evaporator is substantially horizontal.

4. The hydrogen generator according to claim 1, wherein the second steam flow passage and the shifted gas flow passage are configured to exchange heat between them to allow the second steam to recover at least a part of the heat from the shifted gas.

5. The hydrogen generator according to claim 2, having a body internally structured such that:
   a plurality of axial walls are arranged concentrically to be spaced a predetermined distance apart from one another and a plurality of radial walls are provided at predetermined end portions of the axial walls so as to cross the axial walls to define the material flow passage, the reformed gas flow passage, the shifted gas flow passage, a combustion gas flow passage, and the first and second evaporators, the reformer extending along a center axis of the body, and the shifter being formed at a location in an axial direction of the reformer,
   the first evaporator is disposed to allow at least one of heat exchange with the combustion gas flow passage and use of radiation heat from the reformer,
   the first steam flow passage of the material flow passage is disposed to enclose an outer periphery of the reformer in such a manner that one end of the first steam flow passage is fluidically connected to the first evaporator, and an opposite end thereof is fluidically connected to one end face of the reformer in the axial direction corresponding to an upstream face of the reformer in gas flow,
   the reformed gas flow passage is disposed so as to enclose the outer periphery of the reformer in such a manner that one end thereof is fluidically connected to an opposite face of the reformer in the axial direction corresponding to a downstream face of the reformer in gas flow and an opposite end thereof is disposed along and fluidically connected to one end face of the shifter in the axial direction corresponding to an upstream face of the shifter in gas flow, and the shifter is disposed to be opposed to the upstream face of the reformer in the axial direction,
   the shifted gas flow passage is configured such that one end thereof is fluidically connected to an opposite end face of the shifter corresponding to a downstream face of the shifter in gas flow,
   the second evaporator is disposed adjacent the rearmed gas flow passage extending along the upstream face of the shifter, and
   the second steam flow passage is configured such that one end thereof is fluidically connected to the second evaporator and an opposite end thereof is fluidically connected the upstream face of the reformer.

6. The hydrogen generator according to claim 1, further comprising:
   a temperature detector configured to detect temperature of the shifter, wherein, based on temperature of the shifter which is detected by the temperature detector, an amount of the water supplied from the second water supply portion to the second evaporator is adjusted.

7. The hydrogen generator according to claim 1, wherein the water supplied from the first water supply portion to the first evaporator is more in amount than the water supplied from the second water supply portion to the second evaporator.

8. The hydrogen generator according to claim 1, wherein the second water supply portion configured to supply the water to the second evaporator includes a water supply unit and a supply pipe that leads the water supplied from the water supply unit to the second evaporator, and a distance between a water outlet of the supply pipe and the water evaporation surface of the second evaporator is a distance at which a water droplet formed at the water outlet comes in contact with the water evaporation surface before the water droplet drops.

9. The hydrogen generator according to claim 8, wherein the water outlet has a hole diameter of not less than 0.5 mm and not more than 5 nm.

10. The hydrogen generator according to claim 8, wherein the water outlet has a flow cross-sectional area of not less than 0.7 mm² and not more than 20 mm².

11. The hydrogen generator according to claim 10, wherein an amount of the water supplied from the water supply unit is not less than 0.1 g/minute and not more than 2 g/minute.

12. The hydrogen generator according to claim 8, wherein the supply pipe has a flow cross-sectional area that gradually decreases toward the water outlet.

13. The hydrogen generator according to claim 8, wherein an edge portion of a pipe wall of the supply pipe forming the water outlet is not on a horizontal plane.

14. The hydrogen generator according to claim 13, wherein a tip end portion of the supply pipe including the water outlet has a cut out.

15. The hydrogen generator according to claim 8, wherein the tip end portion of the supply pipe including the water outlet is provided perpendicular to the water evaporation surface.

16. The hydrogen generator according to claim 8, wherein the tip end portion of the supply pipe including the water outlet is provided in parallel with the water evaporation surface.

17. A fuel cell power generation system comprising:

the hydrogen generator according to claim 1; and a fuel cell configured to generate an electric power by using a fuel gas containing hydrogen as a major component and an oxidizing gas, the fuel gas being supplied from the hydrogen generator.

* * * * *